US011187911B2

(12) United States Patent
Mikkelsen et al.

(10) Patent No.: US 11,187,911 B2
(45) Date of Patent: Nov. 30, 2021

(54) PROJECTION DISPLAY WITH REPRESENTATION IN MULTIPLE DISPLAY PLANES

(71) Applicant: Bayerische Motoren Werke Aktiengesellschaft, Munich (DE)

(72) Inventors: Hakon Mikkelsen, Aldenhoven (DE); Frederik Morgenstern, Munich (DE); Jens Wieczorek, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 136 days.

(21) Appl. No.: 16/711,608

(22) Filed: Dec. 12, 2019

(65) Prior Publication Data
US 2020/0117014 A1    Apr. 16, 2020

Related U.S. Application Data

(63) Continuation of application No. PCT/EP2018/065950, filed on Jun. 15, 2018.

(30) Foreign Application Priority Data

Jul. 21, 2017    (DE) ..................... 10 2017 212 540.3

(51) Int. Cl.
*G03B 21/00* (2006.01)
*G02B 27/01* (2006.01)
*G03B 21/28* (2006.01)

(52) U.S. Cl.
CPC ..... *G02B 27/0179* (2013.01); *G02B 27/0101* (2013.01); *G03B 21/006* (2013.01); *G03B 21/28* (2013.01); *G02B 2027/0185* (2013.01)

(58) Field of Classification Search
CPC .... G03B 21/006; G03B 21/008; G03B 21/28; G03B 21/62; G03B 21/604; G03B 21/606;
(Continued)

(56) References Cited

U.S. PATENT DOCUMENTS 4,999,011 A    3/1991  Suzuki et al.
6,661,425 B1   12/2003 Hiroaki
(Continued)

FOREIGN PATENT DOCUMENTS

DE            38 12 649 A1    11/1988
DE      10 2012 210 445 A1    12/2013
(Continued)

OTHER PUBLICATIONS

International Search Report (PCT/ISA/210) issued in PCT Application No. PCT/EP2018/065950 dated Sep. 27, 2018 with English translation (seven (7) pages).
(Continued)

*Primary Examiner* — Sultan Chowdhury
(74) *Attorney, Agent, or Firm* — Crowell & Moring LLP

(57) ABSTRACT

A projection display for providing virtual display images on a plurality of display planes which are offset to one another, includes a projection unit for producing a projection beam; and an optical imaging element which is designed to direct the projection beam onto a combination surface and to image, depending on the projection beam, the virtual display images into the plurality of display planes. The projection unit has a plurality of transparent display elements which are arranged so as to be spaced apart and one after the other along the beam path of the projection unit.

8 Claims, 1 Drawing Sheet

(58) Field of Classification Search
CPC ............ G03B 21/2013; G03B 21/2033; G03B 21/2053; G02B 27/01; G02B 27/0101; G02B 27/0179; G02B 27/0093; G02B 2027/011; G02B 2027/0154; G02B 2027/0185; G02F 1/13; G02F 1/155; G02F 1/157; G02F 1/1347; G02F 1/13471; G02F 1/133603; G02F 1/13308; G02F 1/1533

See application file for complete search history.

(56) References Cited

U.S. PATENT DOCUMENTS

| | | | |
|---|---|---|---|
| 6,720,961 | B2 | 4/2004 | Tracy |
| 6,906,762 | B1 | 6/2005 | Witehira et al. |
| 2009/0160736 | A1* | 6/2009 | Shikita ............... G02B 27/0101 345/7 |
| 2010/0220294 | A1* | 9/2010 | Mizuuchi ............. H01S 3/1022 353/20 |
| 2012/0256812 | A1* | 10/2012 | Aoki ...................... B60K 35/00 345/7 |
| 2014/0253848 | A1* | 9/2014 | Wammes ............. H05K 5/0017 349/96 |
| 2016/0070102 | A1 | 3/2016 | Takamatsu et al. |
| 2016/0266477 | A1* | 9/2016 | Chou .................. G02B 27/0101 |
| 2018/0079284 | A1* | 3/2018 | Choi ...................... B60K 35/00 |
| 2019/0086661 | A1 | 3/2019 | Misawa et al. |
| 2019/0331998 | A1* | 10/2019 | Kim ..................... G03B 21/147 |

FOREIGN PATENT DOCUMENTS

| | | |
|---|---|---|
| DE | 10 2013 218 108 A1 | 3/2015 |
| DE | 10 2015 216 794 A1 | 3/2016 |
| DE | 10 2014 226 354 A1 | 6/2016 |
| DE | 10 2014 226 360 A1 | 6/2016 |
| DE | 10 2015 205 871 A1 | 10/2016 |
| JP | 2004-168230 A | 6/2004 |
| KR | 10-1670970 B1 | 11/2016 |
| WO | WO 2017/061019 A1 | 4/2017 |

OTHER PUBLICATIONS

German-language Written Opinion (PCT/ISA/237) issued in PCT Application No. PCT/EP2018/065950 dated Sep. 27, 2018 (six (6) pages).

German-language Search Report issued in counterpart German Application No. 10 2017 212 540.3 dated Apr. 23, 2018 with partial English translation (13 pages).

* cited by examiner

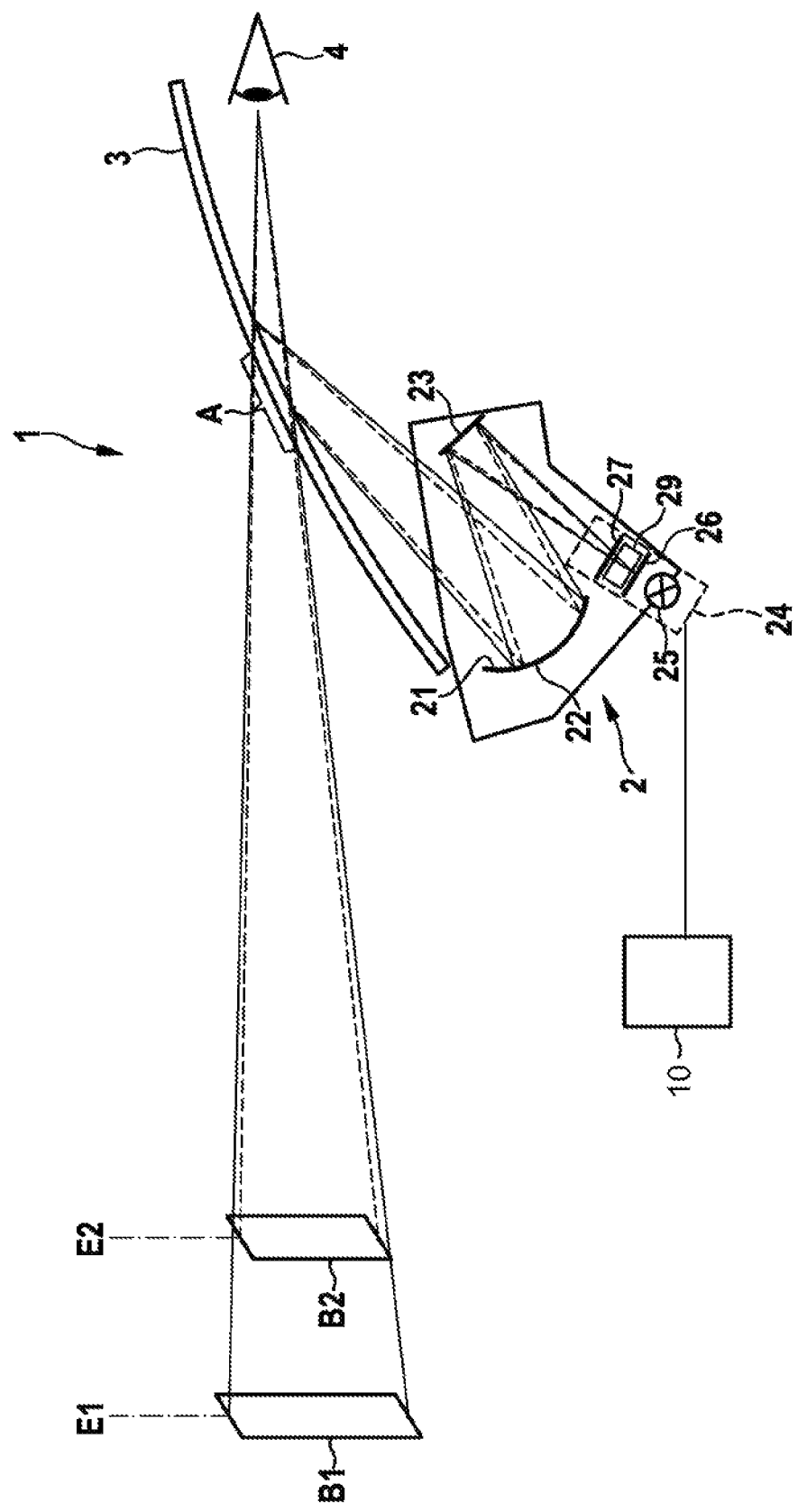

PROJECTION DISPLAY WITH REPRESENTATION IN MULTIPLE DISPLAY PLANES

CROSS REFERENCE TO RELATED APPLICATIONS

This application is a continuation of PCT International Application No. PCT/EP2018/065950, filed Jun. 15, 2018, which claims priority under 35 U.S.C. § 119 from German Patent Application No. 10 2017 212 540.3, filed Jul. 21, 2017, the entire disclosures of which are herein expressly incorporated by reference.

BACKGROUND AND SUMMARY OF THE INVENTION

The invention relates to projection displays, such as head-up displays, for use in motor vehicles or aircraft. The invention furthermore relates to projection displays for representing images in multiple display planes.

Projection displays serve for projecting a display image on a windshield of a motor vehicle via a HUD panel field, alternatively via a separate, partially transparent combination surface positioned between the driver and the front windshield, to display information, such as alerts, speed information, vehicle states, navigation information and the like, to a driver of the motor vehicle. Such projection displays project an image via the panel field such that the driver perceives a virtual display image that is located ahead in a driving direction. The projected image is located on a display plane having an orientation and projection distance that is determined by the projection display and the front windshield.

Furthermore known from the prior art are projection displays in which virtual display images are displayed on a plurality of display planes having different distances from the driver.

For example, document DE 10 2013 218 108 A1 discloses a head-up display having an image producing device that produces a real image, wherein the light rays of the real image are reflected via at least one mirror to a combiner and thus form a beam path and are reflected from there in the direction of a user, such that the user can perceive a virtual image behind the combiner. At least one mirror has two regions having different fields of curvature, wherein different regions of the image producing device are assigned to the different fields of curvature.

Furthermore, document DE 10 2014 226 360 A1 discloses a method for changing an image distance between a virtual image that is projected by a head-up display and an observer of the virtual image. The head-up display to this end has at least one adjustable scattering surface and a projector having an adjustable objective for projecting an image onto the scattering surface. In addition, it has an adjustment device that permits adjustment of the scattering surface and of the objective. A scattering surface adjustment signal is output to the adjustment device to change the image distance by adjusting the scattering surface. An objective adjustment signal is provided to the adjustment device to change the focus and/or the position of the objective in dependence on an adjustment of the scattering surface by way of adjusting the objective such that the objective is focused at the scattering surface.

Document DE 10 2014 226 354 A1 discloses a method for changing the image distance between a virtual image of a head-up display and an observer of the virtual image. The head-up display has an image producing unit, a mirror, which is arranged in the beam path of the light beam such that it is movable in at least one direction, for deflecting the light beam, and a movement device for moving the mirror. An adjustment signal is output to the movement device to adjust a distance, which represents the image distance, between the image producing device and the mirror by moving the mirror.

Document DE 10 2012 210 445 A1 discloses a head-up display in a vehicle. The head-up display has a first image source, the light beams of which are reflected by a first mirror and a magnifying mirror onto a combiner and, from there, are reflected to a user such that the user can perceive the image content of the image source as a virtual image in a first image plane behind the combiner. A second image source is provided, the light beams of which are likewise reflected by the magnifying mirror onto the combiner and, from there, to the user, wherein the length of the beam path between the second image source and the magnifying mirror differs from the length of the beam path between the first image source and the magnifying mirror, with the result that the user can perceive the image content of the second image source as a virtual image in a second image plane.

Document DE 10 2015 205 871 A1 discloses a display apparatus for a field-of-view display system for use as a head-up display in a motor vehicle, comprising a screen arrangement having a plurality of switchable projection screens which are arranged one behind the other in each case with a specified distance in a beam path of a projection image that is to be imaged, wherein the switchable projection screens are switchable between a diffuse state and a transparent state. The plurality of projection screens can be switched using a control unit in a manner such that at least one of the projection screens is switched to diffuse, while the remaining projection screens are switched to transparent.

Document U.S. Pat. No. 6,720,961 B2 discloses a display apparatus, wherein a three-dimensional image of an object is represented using a plurality of transparent OLED displays that are positioned one behind the other.

Document U.S. Pat. No. 6,906,762 B1 discloses a display apparatus, wherein a multi-plane image is generated using a plurality of imaging screens that are positioned one behind the other.

It is the object of the present invention to provide a projection display and a projection system with which representation of a virtual display image in different display planes can be easily realized.

This and other objects are achieved by a projection display for providing virtual display images on a plurality of display planes, and by a projection system, according to the claimed invention.

According to a first aspect, a projection display for providing virtual display images on a plurality of display planes which are offset with respect to one another is provided, comprising:

a projection unit for providing a projection beam; and an imaging optical unit that is configured to direct the projection beam onto a pane segment or a combination surface and to image the virtual display images in the plurality of display planes in dependence on the projection beam;

wherein the projection unit has a plurality of transparent display elements that are arranged spaced-apart one behind the other along the beam path of the projection unit.

One idea relating to the above projection display is that of producing virtual display images on a plurality of display planes that are offset with respect to one another by way of guiding a plurality of projection images that are offset with respect to one another through a common imaging optical unit. In order to represent the display planes to an observer at different projection distances, a plurality of transparent display elements are positioned in the imaging unit such that they are offset with respect to one another along the optical axis. Virtual display planes which are correspondingly offset with respect to one another and are spaced apart at a distance that is obtained from the distance of the display elements which are offset with respect to one another are generated by the imaging optical unit.

According to one embodiment, the projection unit can have a plurality of transparent display elements, wherein the pixels of the transparent display elements are self-luminous, wherein in particular at least one of the display elements is embodied in the form of a TOLED display element.

According to an alternative embodiment, the projection unit can have a plurality of transparent display elements that are arranged in the beam path between a light source and the imaging optical unit, wherein in particular at least one of the display elements is embodied in the form of an LCD display element.

According to an alternative embodiment, the projection unit can have a plurality of transparent display elements that are arranged in the beam path between a light source and the imaging optical unit, wherein in particular at least one of the display elements is embodied in the form of an LCD display element and at least one of the display elements is embodied in the form of a TOLED display element.

The aforementioned projection display apparatus has the advantage that, when LCD displays are used, only one light source is required for the projection and the additional installation space is very low because the display elements are arranged between the light source and the imaging optical unit. When LCD displays having a planar bright light source are used, high luminance can be obtained. In TOLED displays, the additional installation space is likewise low because these are planar, light-emitting displays.

The imaging optical unit can furthermore be configured to represent the projection image in magnified fashion and in particular have a focusing lens or a concave mirror.

According to one embodiment, a light source of the projection unit can have a planar design.

At least one of the display elements may be arranged with its surface normal being inclined with respect to an optical axis of the projection unit to produce an image in an inclined image plane.

The display elements can each have a planar transparent display device which is actuable to represent a partially transparent colored and/or non-transparent pixel or a transparent pixel.

According to a further aspect, a projection display system with the aforementioned projection display and a control unit is provided, wherein the pixels of the display elements are actuable to be transparent, partially transparent colored or non-transparent.

In particular, the control unit can be designed such that the display elements are actuated with the same frequency, and the individual frequencies are synchronized among one another. It should hereby be possible to represent an image on one of the display elements and to set the remaining ones to transparent. Images are represented in alternation on the display elements, with the latter being visible through the remaining ones.

It is furthermore possible hereby to represent non-transparent regions on the display elements.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic cross-sectional illustration of a projection display system.

DETAILED DESCRIPTION OF THE DRAWING

FIG. 1 shows a projection display system 1 having a projection display 2 which reflects a projection image at a pane segment A of a front windshield 3 so as to make a virtual display image visible to the eye of a user 4. The user 4 perceives virtual display images B1, B2 in display planes E1, E2. The virtual display images B1, B2 in the display planes E1, E2 are perceived on the side of the front windshield 3 that lies opposite the user 4, that is to say outside the motor vehicle.

The projection display apparatus 2 has an imaging optical unit 21 which, in the exemplary embodiment illustrated, has a concave mirror 22 and a plane mirror 23 as optical imaging elements. Different embodiments can have different optical imaging elements, such as a converging lens, a convex lens and the like. In the illustrated embodiment, a projection image transmitted by a projection unit 24 is reflected via the plane mirror 23 onto the concave mirror 22 and there reflected at a pane segment A that serves as a combination surface in order to provide the corresponding virtual display images B1, B2 for the eye of the user 4.

The projection unit 24 has a light source 25 and a first display element 26 and a second display element 27. The display elements can be embodied for example in the form of LCD display elements. The display elements 26, 27 are provided with actuable pixels to represent a projection image.

The LCD display elements 26, 27 are embodied to be substantially transparent and can produce a partially transparent or non-transparent pixel in each case by way of actuation. The display elements 26, 27 each have a planar transparent LCD display device that is actuable to represent a colored and/or non-transparent pixel or a transparent pixel.

The light source 25 preferably has a planar design to provide planar background illumination of the display elements 26, 27, such that, depending on the actuation of the pixels of the display elements 26, 27, a corresponding projection image is projected in the direction of the plane mirror 23.

In an alternative embodiment, the transparent display elements can be embodied with self-luminous actuable pixels, such as for example in the form of TOLED display elements. In this case, a separate light source can be dispensed with.

In an alternative embodiment, the transparent display elements can be formed from a combination of transparent LCD display elements and self-luminous actuable pixels, such as for example in the form of TOLED display elements.

Pixels on the different display elements 26, 27 are represented in the different virtual display planes E1, E2 by way of the imaging optical unit 21. The distance between the virtual display planes E1, E2 substantially depends on the distance of the display elements 26, 27 and the imaging properties or the magnification properties of the imaging optical unit 21.

The distance of the virtual image planes, which corresponds to a perceived distance between display images, can furthermore be changed by way of a focus changing element 29 between the first and second display elements 26, 27.

Such an optical focus changing element can be made from a transparent dispersion material, such as glass, PMMA or the like. The display elements can furthermore be embodied in the form of a multilayer display having mutually parallel image representation planes or image representation planes that are arranged at an incline with respect to one another. Due to the fact that the aforementioned construction requires only one light source, the costs and installation space of such a projection display arrangement can remain low. The costs and the installation space of the projection display arrangement remain low even when using self-luminous transparent display elements, such as for example TOLEDs.

The projection display system 1 can have a control unit 10. At least one pixel of the first display element 26 and one pixel of the second display element 27 are here arranged one behind the other in the beam path of the projection unit 24. The control unit 10 actuates the display elements 26, 27 in a manner such that at least one of the pixels can be switched to transparent.

Alternatively, the control unit 10 can transmit control signals to the display elements 26, 27 and actuate the pixels of the display elements to be transparent, partially transparent colored or non-transparent. In particular, the control unit is designed such that the display elements are actuated with the same frequency, and the individual frequencies are synchronized among one another.

LIST OF REFERENCE SIGNS 1 projection display system
2 projection display apparatus
3 front windshield
5 user
B1, B2 virtual display images
E1, E2 display planes
21 imaging optical unit
22 concave mirror
23 plane mirror
24 projection unit
25 light source
26 first display element
27 second display element
29 focus changing element The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A projection display for providing virtual display images on a plurality of display planes which are offset with respect to one another, the projection display comprising:
   a projection unit for providing a projection beam having a beam path; and
   an imaging optical unit that is configured to direct the projection beam onto a combination surface and to image the virtual display images in the plurality of display planes in dependence on the projection beam; wherein:
   the projection unit has a plurality of transparent display elements that are arranged spaced-apart one behind the other along the beam path of the projection unit,
   the plurality of transparent display elements are arranged in the beam path between a light source and the imaging optical unit, and
   at least one of the display elements is embodied as an LCD display element and at least one of the display elements is embodied as a TOLED display element.

2. The projection display according to claim 1, wherein pixels of the TOLED display elements are self-luminous.

3. The projection display according to claim 2, wherein the light source of the projection unit has a planar design.

4. The projection display according to claim 1, wherein the light source of the projection unit has a planar design.

5. The projection display according to claim 1, wherein the imaging optical unit is configured to represent the projection image in a magnified manner and comprises a focusing lens or a concave mirror.

6. The projection display according to claim 1, wherein at least one of the display elements is arranged with its surface normal inclined with respect to an optical axis of the projection unit to produce an image in an inclined image plane.

7. A projection display for providing virtual display images on a plurality of display planes which are offset with respect to one another, the projection display comprising:
   a projection unit for providing a projection beam having a beam path; and
   an imaging optical unit that is configured to direct the projection beam onto a combination surface and to image the virtual display images in the plurality of display planes in dependence on the projection beam; wherein:
   the projection unit has a plurality of transparent display elements that are arranged spaced-apart one behind the other along the beam path of the projection unit, and
   the display elements are in each case actuable to represent partially transparent colored and/or non-transparent pixels or transparent pixels.

8. A projection display system, comprising:
   the projection display according to claim 7 and
   a control unit, wherein the pixels of the display elements are actuable, via the control unit, to be transparent, partially transparent colored or non-transparent.

* * * * *